United States Patent
Christoffersen (10) Patent No.: US 6,581,841 B1
(45) Date of Patent: Jun. 24, 2003

(54) APPARATUS AND METHOD FOR SECURE INFORMATION PROCESSING

(75) Inventor: Per Christoffersen, Værløse (DK)

(73) Assignee: SAGEM Denmark A/S, Glostrup (DK)

( * ) Notice: Subject to any disclaimer, the term of this patent is extended or adjusted under 35 U.S.C. 154(b) by 0 days.

(21) Appl. No.: 09/719,838

(22) PCT Filed: Jun. 24, 1999

(86) PCT No.: PCT/DK99/00361
§ 371 (c)(1),
(2), (4) Date: Jan. 24, 2001

(87) PCT Pub. No.: WO00/01100
PCT Pub. Date: Jan. 6, 2000

(30) Foreign Application Priority Data

Jun. 26, 1998 (DK) .......................... 1998 00845

(51) Int. Cl.⁷ .............................. G06K 19/06
(52) U.S. Cl. ........................ 235/492; 235/380
(58) Field of Search ............... 713/172, 194; 380/1; 235/380, 492

(56) References Cited

U.S. PATENT DOCUMENTS

| | | | |
|---|---|---|---|
| 4,575,621 A | * 3/1986 | Dreifus | 235/380 |
| 5,406,630 A | * 4/1995 | Piosenka et al. | 380/52 |
| 5,663,553 A | * 9/1997 | Aucsmith | 235/492 |
| 5,758,121 A | 5/1998 | Fukuzumi | |
| 5,761,144 A | 6/1998 | Fukuzumi | |
| 5,883,429 A | * 3/1999 | Houdeau et al. | 257/704 |

FOREIGN PATENT DOCUMENTS

GB 2275654 9/1994
WO 9114354 9/1991

OTHER PUBLICATIONS

Gibilisco, Stan and Sclater, Neil. Encyclopedia of Electronics, 2$^{nd}$ Ed. 1990.*

* cited by examiner

Primary Examiner—Karl D. Frech
Assistant Examiner—Daniel A Hess
(74) Attorney, Agent, or Firm—Birch, Stewart, Kolasch & Birch, LLP (57) ABSTRACT

The present invention relates to an apparatus and method for secure information processing. In particular, the present invention relates to an apparatus for and a method of providing secure encryption of sensitive information, often information related to money transactions, which must be kept secret. It has recently been found that monitoring the power supply leads and/or input/output ports of e.g. a microprocessor or a chip-card processor performing information encryption in an apparatus may reveal the security sensitive information. According to the present invention, a cost-effective and fast solution to this problem has been found. The solution utilises secondary power storing means that may be encapsulated together with the microprocessor so as to prevent unauthorised access to the processor's power supply leads. This encapsulated power supply is capable of supplying power to the microprocessor during security critical phases of an encryption program running on the microprocessor. Accordingly, external power leads or wires that normally feed power from a primary power supply to the microprocessor may be disconnected by a switching device during these security critical phases and power may instead be supplied from the encapsulated secondary power storing means, thereby monitoring the primary power supply leads will not reveal information about the sensitive information to be encrypted.

34 Claims, 2 Drawing Sheets

APPARATUS AND METHOD FOR SECURE INFORMATION PROCESSING

This application is the national phase under 35 U.S.C. §371 of PCT International Application No. PCT/DK99/00361 which has an International filing date of Jun. 24, 2000, which designated the United States of America.

The present invention relates to secure processing of information, and especially a method and an apparatus for providing secure encryption of information to be kept safe from access by e.g. fraudulent persons.

In a number of applications, encryption is used prior to transmitting sensitive information over "open" communication channels. This information often relates to money transactions but may be any type of more or less security critical information relating to money transactions or other types of transactions. In some of these transactions, not even all of the circuitry at which this information is entered or generated may be assumed secure or safe from third parties. In this situation, the often very sensitive keys on which the encryption is based may be accidentally divulged. In order to prevent that, so-called security or safety modules are provided wherein the encryption takes place and wherein the encryption keys are stored in a secure manner. This "secure manner" often incorporates enclosing the encryption means and the means holding the keys within an enclosure together with means for detecting attempts to divulge the keys or encryption procedure. These detecting means could upon such detection delete the keys and encryption procedure or otherwise render these unreadable. In this manner, once the information has been entered into the holding means, it only re-exits in encrypted form.

Another similar process to be performed securely is the authentication of a message. An authentication may be performed by performing an operation on the message—which may have been sent in clear text—the result of which operation is encrypted and transmitted to the receiver who decrypts the result and compares it to a similar operation performed at the receiver. If the results match, the message has not been altered during transmission.

Naturally, encryption and decryption as well as generating the authentication information and the authentication step at the receiver should be performed securely, as all these operations involve the sensitive methods and keys.

However, it has recently been observed that the processing of information within a microprocessor can be monitored via monitoring its power consumption—as well as by monitoring the microprocessors I/O ports. In this manner, the methods by which the information is encrypted, i.e. encryption algorithms and possibly the encryption keys may be determined by fraudulent persons or other unauthorised third parties and, accordingly, seriously reduce the overall security of the system.

It was recently published that monitoring the power consumption of the processor may reveal such security sensitive information. It has also been found that there exist at least two other mechanisms that may reveal information pertaining to me processing of the microprocessor. The I/O ports of the processor are capacitively coupled to many other parts of the microprocessor whereby signals relating to e.g. encryption processing of the processor may be accidentally transferred to the I/O ports. Another mechanism that also may transfer these'signals to the I/O ports of the processor is a typical common voltage supply line between the CPU part of the microprocessor and the I/O ports of the processor. Ripple voltages on this common supply line, originating from current pulses that supplies power to logic circuitry of the CPU, will also modulate the voltage supplies of the I/O ports so that measuring fluctuations of I/O port output voltages may accidentally reveal information as to the processing of the processor.

The present invention provides simple and innovative solutions to these above-mentioned problems. Different solutions have prior been proposed relating to different manners of altering the actual encryption method, in order for the divulged information to be less clear. However, to rapidly modify existing apparatuses and methods, the present invention enables the use of existing and fully verified encryption methods.

Another object of the invention is to provide a method of modifying the existing apparatus so as to utilise a relatively small amount of additional hardware which can be integrated within the relatively small volume of the shielding means.

Consequently, in a first aspect, the invention relates to an apparatus for secure processing of information according to claim 1.

In the context of money transaction machines, ATMs, vending machines etc., the means for providing the information to be processed may be a keyboard from which a PIN code to be encrypted is provided—or circuitry external to the holding means providing other information to be encrypted, such as information that is used in a money transaction. The means for providing the information may also comprise a bi-directional serial data bus that transfers the information between a chip-card reader or station and the processing means in the form of a chip-card processor arranged on a chip card.

Accordingly, an apparatus according to the present invention may also be a chip-card. A chip-card comprises a chip-card processor arranged on or buried within the card, typically in a dent or indentation moulded or drilled in the plastic carrier of the card. The chip card processor is often encapsulated by a lump of protective material such as a lump of epoxy coating to keep moisture and other contamination away from processor and functioning as the holding means of the chip-card processor in the present context. A chip card processor typically comprises a CPU part or CPU circuit block to perform encryption/decryption algorithms as well as performing various "house holding" tasks such as reading from and writing to a volatile and/or non-volatile memory, communication over I/O parts etc. required to make the chip-card provide a specified functionality. Optionally, the chip card processor may additionally comprise an encryption processor which may relieve a part of the CPU workload by calculating the often complex encryption/decryption algorithms such as algorithms based on private key-public key coding forms. These algorithm calculations as well as their associated key clearly comprise processing of security critical information that should be hidden from unauthorised third parties. The calculation of the algorithms may be entirely performed by the encryption processor, if one is available within the processing means, or alternatively only partly, depending on the calculation workload associated with a particular algorithm with respect to the processing power of the CPU and the encryption processor.

According to a preferred embodiment of the invention, the encryption processor performs substantially all of the required security critical or secret processing while being supplied with power from the second power supplying means during these security critical operations. In this embodiment, the CPU may be provided with power from the first power supply means since it is not performing any security critical operation. By supplying power to the CPU from the first supply, the power stored in the second power supply may allow more processing steps to be performed in the encryption processor before the power storing capability of that supply is exhausted. Accordingly, in this embodiment, the encryption processor may advantageously perform substantially all of the required secret processing so that monitoring the power consumption of the first power supply does not reveal any information as to the security critical processing steps, encryption keys and algorithms utilised by the chip-card processor.

The second power supplying means may comprise one or several capacitors integrated on the chip-card processor. This makes monitoring of the power consumption of such integrated capacitor(s) very difficult, due to the extremely small size of integrated circuit blocks and capacitors and their associated power wiring. Furthermore, the surface of the chip-card processor may be covered with a highly resistant coating that even makes micro-probing of the chip difficult or impossible. According to an alternative embodiment, a dedicated capacitor substrate, holding one or several capacitors, and abutting the chip-card processor may provide the second power supplying means. This solution may be advantageous if the integrated capacitors on the chip-card processor are not capable of providing a sufficient amount of power for the processing means which perform the security critical processing.

The holding means may make physical access to the processing means difficult or impossible, such as holding means provided by a metal casing or housing or a hard lump of epoxy coating. Instead of making access impossible, the holding means may cause unauthorised opening thereof to break certain parts of circuitry therein. Also, the circuitry therein may provide functions and/or comprise means for erasing or otherwise making encryption keys and methods unreadable when an attempt to gain access to them has been detected. In that situation, the holding means would act also to merely prevent accidental opening which would cause immediate destruction of the operability of the encrypting means.

Thus, by providing a power storing means within the holding means, power does not need to be provided from the outside of the holding means to the processing means when the processing is performed. In that manner, the above-mentioned detection of parameters of the processing method may be avoided.

Often, the first power supplying means are a number of wires, and, optionally, also a number of electrical contact pads, transporting power generated outside the holding means to the inside of the holding means. In prior art apparatuses, the power received from these wires would directly feed e.g. the processing means in the holding means. According to the invention, this direct supplying of power may now be prevented, at least in time intervals wherein Use security critical part of the processing is performed. Thereby, these wires do not accidentally relay information to the outside of the holding means about the processing of the processing means.

Preferably, the second power supplying means are adapted to supply power to the processing means or at least the part of the processing means, when the switching means prevent power feeding from the first power supplying means to the processing means or at least the part of the processing means.

In order to prevent any relaying of the abovementioned information relating to the operation of the processing means to the outside of the holding means via the operation of the storing means, the controlling means are preferably also adapted to control the switching means to prevent power from being fed from the first power supplying means to the power storing means while they prevent power feeding from the first power supplying means to the processing means.

Normally, it would only be required to provide "internal powering" to the processing means or the at least part of the processing means during the periods of time where the processing means perform security critical processing of Information. Therefore, the controlling means are preferably also adapted to control the switching means to re-establish power feeding from the first power supplying means to the processing means or the at least part of the processing means after they have performed the security critical processing. In that situation, it may also be advantageous that the controlling means are also adapted to control the switching means to re-establish power feeding from the first power supplying means to the power storing means, when the processing means or the at least part of the processing means have performed the security critical processing.

Normally, the apparatus further comprises means for outputting the processed information for transferring it to e.g. a receiving party for decryption in the case where the processing comprises a security critical processing such as encryption and/or for check of authenticity.

Normally, the processing means will be adapted to be controlled by a set of instructions. In that situation, it will be preferred that the set of instructions comprises one or several preventing instructions making the controlling means control the switching means to prevent power feeding from the first power supply means to the processing means or the least part of the processing means. The set of instructions which is associated with a particular application will often comprise a subset of instructions which performs the security critical part of the processing. This security critical subset of instructions is preferably preceded by the preventing instruction. This subset of instructions would often be the software handling the actual security critical processing and accordingly any, information about this should be prevented from leaking.

Preferably, the set of instructions furthermore comprises a re-establishing instruction subsequent to the security critical subset of instructions the re-establishing instruction making the controlling means control the switching means to re-establish the power feeding from the first power supplying means to the processing means and optionally to the power storing means.

Thus, in fact, using the present invention, the security critical information as well the subset of instructions performing the security critical processing (often comprising an encryption/decryption algorithm) may remain unaltered, and the only modification required of the software controlling the processing means may be the introduction of the preventing and re-establishing instructions before and after the security critical part of the processing.

Even though the prevention of feeding of power to the processing means would ensure that information relating to the processing process is not divulged via the power consumption, it may be preferred that the switching means are adapted to, when preventing power feeding from the first power supplying means to the processing means, remove a galvanic connection of the first power supplying means between the outside of the holding means and the processing means, and similarly that the switching means are also adapted to, when preventing power feeding from the first power supplying means to the storing means, remove a galvanic connection of the first power supplying means between the outside of the holding means and the storing means.

Preferably, the power storing means are selected from the group consisting of: a battery, a capacitor, and an inductor and switching means are preferably selected from the group consisting of: relays, transistors, and diodes.

A simple operation of the "switching" of power supplying means may be obtained when the storing means and second power supplying means are adapted to automatically provide power to the processing means or the at least part of the processing means, when the switching means operates to prevent feeding of power from the first power supplying means to the processing means or the at least part of the processing means. In this manner, the one switching means may suffice in order to perform the switching. An alternative it solution is obtained when the apparatus comprises an additional switching means adapted to provide and/or prevent power from the storing means and the second power supplying means to the processing means or the at least part of the processing means, when the switching means operate to prevent feeding of power from the first power supplying means to the processing means or the at least part of the processing means. In that manner, two switching means are provided, the operation of which may e.g. be co-ordinated.

In general, the security critical processing of the information may be any processing involving security sensitive algorithms or data. Most of such processing involves encryption, decryption, authenticity check or the generation of data for use in a subsequent authenticity check.

In a second aspect, the present invention relates to a method of secure processing information using the above-mentioned apparatus, the method comprising providing the information to be processed, operating the switching means in order to prevent power feeding from the first power supplying means to the processing means or the at least part of the processing means, supplying power to the processing means or the at least part of the processing means from the power storing means using the second power supplying means, and processing the information using the processing means or the at least part of the processing means.

Preferably, the switching means also prevent power from being fed from the first power supplying means to the power storing means, while also preventing power feeding from the first power supplying means to the processing means or the at least part of the processing means.

As mentioned above, it is also preferred that the switching means re-establish power feeding from the first power supplying means to the processing means or the at least part of the processing means, when they have performed the security critical processing—and that the switching means re-establish power feeding from the first power supplying means to the power storing means, when the processing means or the at least part of the processing means have performed the security critical processing.

Also, normally, the method would further comprise the step of outputting the processed information or at least part of the information after the processing thereof, as the information is now in a non-readable format for third parties and may thus securely be transmitted to the intended recipient, if encryption/decryption forms part of the processing.

When processing means comprises means for controlling the operation of the switching means, the method preferably comprises the step that the controlling means prevent power feeding to the processing means or the at least part of the processing means and optionally the power storing means before the processing means performs the security critical part of the processing.

Preferably, the security critical processing steps are performed when the processing means is solely powered by the power storing means. When performing non-secret processing tasks as e.g. the above-mentioned "house-holding" tasks, the processor means may however be powered by the first power supplying means to the extent that these non-secret tasks do not involve sensitive or security critical operations or information. Normally, the method furthermore comprises the step of supplying power from the first power supplying means to the storing means before the step of operating the switching means in order to prevent feeding of power from the first power supplying means to the processing means or the at least part of the processing means. In that manner, the power storing means will be charged before power is required therefrom.

A simple operation is obtained, when power is automatically provided from the storing means to the processing means or the at least part of the processing means, when the switching means operate to prevent feeding of power from the first power supplying means to the processing means or the at least part of the processing means.

Alternatively, the apparatus may further comprise an additional switching means, and the method comprising providing, using the additional switching means, power from the storing means and the second power supplying means to the processing means or the at least part of the processing means, when the switching means operate to prevent feeding of power from the first power supplying means to them.

As is clear from the above, the present invention prevents that security critical information, or optionally any other information, will be revealed via the power consumption and at the same time makes it possible to retain most of the original apparatus. The modifications to be performed comprise the addition of a few electrical components and possibly a few additions to the existing software running on the processor means of the apparatus.

Also, the processing of the information will often incorporate an encryption or decryption of the information that has to be kept secret or an authenticity check or the generation of data for use in an authenticity check.

Consequently, in a third aspect, the invention relates to a method of altering an existing apparatus for secure processing of information, the apparatus comprising:

means for providing the information to be processed, means for processing the information, means for holding or encapsulating the processing means, first means for supplying power from a position outside the holding means to the processing means.

In the situation where the processing means is controllable by a set of instructions comprising a subset of adjacent instructions making the processing means or the at least part of the processing means perform the security critical processing, the present method preferably comprises introducing in the set of instructions a first preventing instruction preceding the subset of instructions, the preventing instruction being adapted to make the controlling means make the switching means prevent power feeding from the power supplying means to the processing means or the at least part of the processing means.

Also, in that situation the method further preferably comprises inserting a first re-establishing instruction subsequent to the subset of instructions, the re-establishing instruction being adapted to make the controlling means make the switching means re-establish power feeding from the first power supplying means to the processing means or the at least part of the processing means.

As described above, the controlling means are preferably also adapted to control the switching means to prevent power from being fed from the first power supplying means to the power storing means. In that situation, the method may comprise providing controlling means adapted to control the switching means to prevent power from being fed from the first power supplying means to the power storing means and inserting a second preventing instruction preceding the subset of instructions, the second preventing instruction being adapted to make the switching means prevent power feeding from the first power supplying means to the power storing means.

In that situation, the controlling means will typically also be adapted to control the switching means to re-establish power feeding from the first power supplying means to the storing means, whereby the method would comprise inserting a second re-establishing instruction subsequent to the subset of instructions, the second re-establishing instruction being adapted to make the switching means re-establish power feeding from the first power supplying means to the power storing means.

In a further aspect, the invention relates to an apparatus for securely processing information, according to claim 36.

Thus, this aspect addresses the problem of revealing security critical information via I/O ports or other ports of the processing means.

Most often, the signals output from such processing means during normal I/O operation will have a frequency lower than the information output accidentally via capacitive coupling within the processing means.

Consequently, the predetermined signals may be signals having a frequency above 100 kHz, such as above 200 kHz, preferably above 300 kHz, such as above 500 kHz, preferably above 700 kHz, such as above 800 kHz, preferably above 900 kHz, such as above 1 MHz, preferably above 1.5 MHz.

As the predetermined signals will often be correlated to the clock frequency of the processing means when the processing means is a processing means operating in accordance with a clock frequency, the predetermined signals may be signals having a frequency above 0.01% of the clock frequency, such as above 0.02% of the clock frequency, preferably above 0.05% of the clock frequency, such as above 0.08% of the clock frequency, preferably above 0.1% of the clock frequency, such as above 0.12% of the clock frequency, preferably above 0.15% of the clock frequency, such as above 0.17% of the clock frequency, preferably above 0.2% of the clock frequency.

In one embodiment, the preventing or attenuating means may comprise filtering means, such as low pass filtering means, adapted to remove or attenuate the predetermined signals.

In the case of a low pass filter, the filter may have a cut off frequency being below a lowest frequency of the predetermined signals, such as below 0.9 times the frequency of the predetermined signals, preferably below 0.8 times the frequency of the predetermined signals, such as below 0.6 times the frequency of the predetermined signals, preferably below 0.5 times the frequency of the predetermined signals, such as below 0.3 times the frequency of the predetermined signals, preferably below 0.1 times the frequency of the predetermined signals.

Alternatively, the preventing means or attenuating means may comprise switching means adapted to prevent or attenuate any signals along the transporting means. Such a switching means may be selected from the group consisting of: a transistor, a relay and a diode.

The controlling means are adapted to control the preventing means to prevent the predetermined signals while the processing means processes the security critical part of the information. They need not perform this task constantly, i.e. during processing steps where e.g. "house holding" tasks are performed by the processing means. However, if the signals to be output during normal I/O operation of the processor spans across a large frequency range, it may be the simplest to simply provide means constantly performing the preventing. Alternatively, the preventing are performed at those time intervals, where it is required that information cannot leak e.g. during security critical processing. Thus, in that situation, the controlling means are adapted to control the preventing means to initiate preventing at a point in time before a point in time where the processing means initiate the processing of the information. In that situation, the controlling means are adapted to control the preventing means to stop preventing at a point in time after a point in time where the processing means has finished the processing of the security critical information.

Naturally, the apparatus will normally comprise means for outputting the processed information or at least a part of the information.

The processing means may be adapted to be controlled by a set of instructions, the instructions comprising a preventing instruction making the controlling means instruct the switching means to prevent the predetermined signals. Also, normally the set of instructions comprises a subset of instructions making the processing means perform the security critical processing, the subset of instructions being preceded by the preventing instruction, and preferably the set of instructions furthermore comprises a re-establishing instruction subsequent to the subset of security critical instructions, the re-establishing instruction making the controlling means stop preventing the predetermined signals.

In order to fully ensure that the predetermined signals are prevented from flowing, the preventing means may be adapted to, when preventing the predetermined signals, remove a galvanic connection of the transmitting means between the outside of the holding means and the processing means.

Many types of security critical processing may be contemplated. However, some of the most widely used are an encryption, a decryption, an authentication or an authentication check of the information.

Another aspect of the invention relates to a method of securely processing information using the apparatus according to the above aspect, the method comprising providing the information to be processed, operating the preventing means in order to prevent the predetermined signals, and processing the information using the processing means.

In one situation, the preventing means prevent transportation of the predetermined signals, when the processing means perform the processing.

The processing means comprise means for controlling the operation of the preventing means, and the method may comprise the step that the controlling means operate the preventing means so as to prevent the predetermined signals before the processing means performs the security critical processing.

In that situation, it would be suitable if the method comprises the step that the controlling means operate the preventing means so as to re-establish flow of the predetermined signals, when the processing means has performed the security critical processing.

A last aspect of the invention relates to a method of altering an existing apparatus for securely processing information, the apparatus comprising:

means for providing the information to be processed, means for processing the information, means for holding or encapsulating the processing means, and means for transport information from the outside of the holding means to the processing means or from the processing means to the outside of the holding means.

Preferably, when the processing means is controllable by a set of instructions comprising a subset of adjacent instructions making the processing means perform the security critical processing, the method would comprise introducing in the set of instructions a first preventing ion preceding the subset of instructions, the preventing instruction being adapted to make the controlling means make the preventing or attenuating means prevent or attenuate the predetermined signals.

In that situation, preferably the method would also further comprise inserting a first re-establishing instruction subsequent to the subset of instructions, the re-establishing instruction being adapted to make the controlling means make the preventing or attenuating means not prevent or attenuate the predetermined signals.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following, preferred embodiments of the invention will be described with reference to the drawings, which are given by way of illustration only, and thus are not limitative of the present invention, and wherein.

DETAILED DESCRIPTION OF PREFERRED EMBODIMENTS

Figure 1:
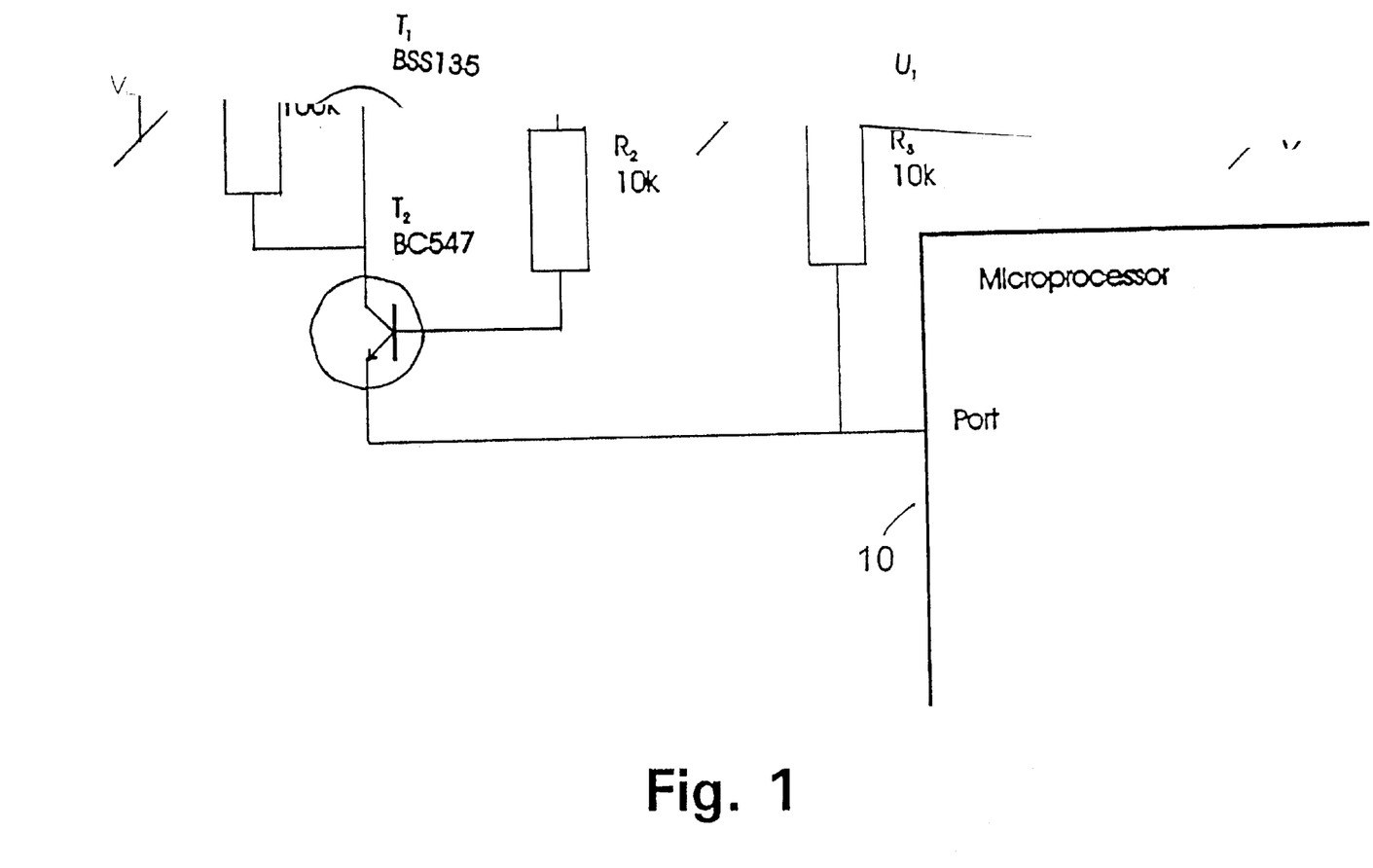
FIG. 1 illustrates a slightly altered Ascom SWE 115-0010 Outdoor Security Keyboard according to one embodiment of the invention.

FIG. 1 illustrates a slightly altered Ascom SWE 115-0010 Outdoor Security Keyboard comprising an encrypting processor, relating data memories etc. and a keyboard for the user to enter his PIN code. FIG. 1 only illustrated the novel features of this device, the remaining features being standard elements.

This standard device comprises a holding means (not illustrated) holding a processor 10 into which the PIN code received from the keyboard (not illustrated) is fed, subsequently encrypted, and output to a unit (not illustrated) external to the holding means.

This processor 10 is receives power from outside the holding means by means of wires 20 providing a ground wire and a 12V supply wire denoted Vin. In the prior art devices, these wires would simply feed the processor 10. However, in the present embodiment, power wires 30 (denoted GND providing ground to the processor and Vcc providing 5V) perform this task, and a number of additional elements to be described below are positioned between the Vin and Vcc power nets.

The alteration of this standard device comprises providing the following elements:

a transistor T1 (such as a BSS 135), a transistor T2 (such as a BC 541), a voltage regulator U1 (such as an LP2981) ensuring that Vcc remains 5V even though Vin varies, two capacitors, C2 and C3 (such as 2,2 $\mu$F and 220 $\mu$F, 16V, respectively), and three resistors R1, R2, and R3 (such as 100 KOhms, 10 KOhms, and 10 KOhms, respectively), as illustrated in the drawing.

In this embodiment, the port of the processor 10 controls the operation of T2 and T3.

The operation of this altered power feeding of the processor 10 is as follows:

Normal Operation

During normal operation, the processor 10 is powered through the wires 20. In this situation, the I/O port voltage is approx. 5V whereby the Base and Emitter of T2 receive the same voltage and the Collector of T2 does not draw a current. Thus, the Drain and Gate of T1 receive the same voltage, whereby T1 is conducting, power is fed to Vin, and C3 (40) is charged by the voltage.

Isolating Operation

When the processor 10 performs predetermined operations, particularly security sensitive operations such as encrypting operations, the nature of which should not be determinable via the wires 20, the I/O port programmed to 0V, whereby the Emitter of T2 is drawn to low, a Base current flows through R2, and T2 draws Collector current. Thereby, the Gate of T1 is drawn low, whereby T1 becomes non-conducting. Consequently, the processor 10 is isolated from the outside of the encapsulating means (not illustrated).

In the isolated operation, the processor 10 is powered by the charge held by C3 (40), which is initially charged to the voltage of Vin. U1 will maintain Vcc at 5V, until the voltage of C3 (40) becomes lower than approx. 7V. However, in the present embodiment, the processor 10 is only required to operate in the isolated mode for time intervals of approx: 50 ms, whereby the capacitor C3 (40) merely needs to be dimensioned to that requirement.

Operation During Power On

Naturally, it is vital that the circuitry assumes the normal operation on power on, as it will otherwise remain idle. However, most microprocessors are adapted to have their ports remain low until explicitly instructed to the opposite.

Consequently, on power on, the port will automatically be low, whereby T1 will be conducting, whereafter C3 (40) will be charged, and the processor is powered through the wires 20.

When to Assume the Isolating Operation

Many of the processing tasks performed by the processor 10 are of "house holding" types (checking input data, communication, check of safety rules, etc) which are not security critical. Therefore, when performing such tasks, the apparatus may assume a normal mode of operation.

In fact, it will normally be possible to identify a number of security critical processing tasks and thereby a number of subsets of instructions in the software controlling the processor during which the device should assume the isolated operation. Using his embodiment, the only alterations of the software would be to insert instructions before and after these identified security critical subsets of instructions, these new instructions being ones making the port go high and low, respectively. According to this embodiment, the capacitor C3 (40) is required to supply power to the processor 10 during relatively short time intervals wherein the security critical subsets of instructions are actually running. In that manner, the capacity—and the proportional physical size—of C3 (40) may be chosen small enough for it to fit into the existing holding means, as it should only supply power during these identified time intervals.

Figure 2:
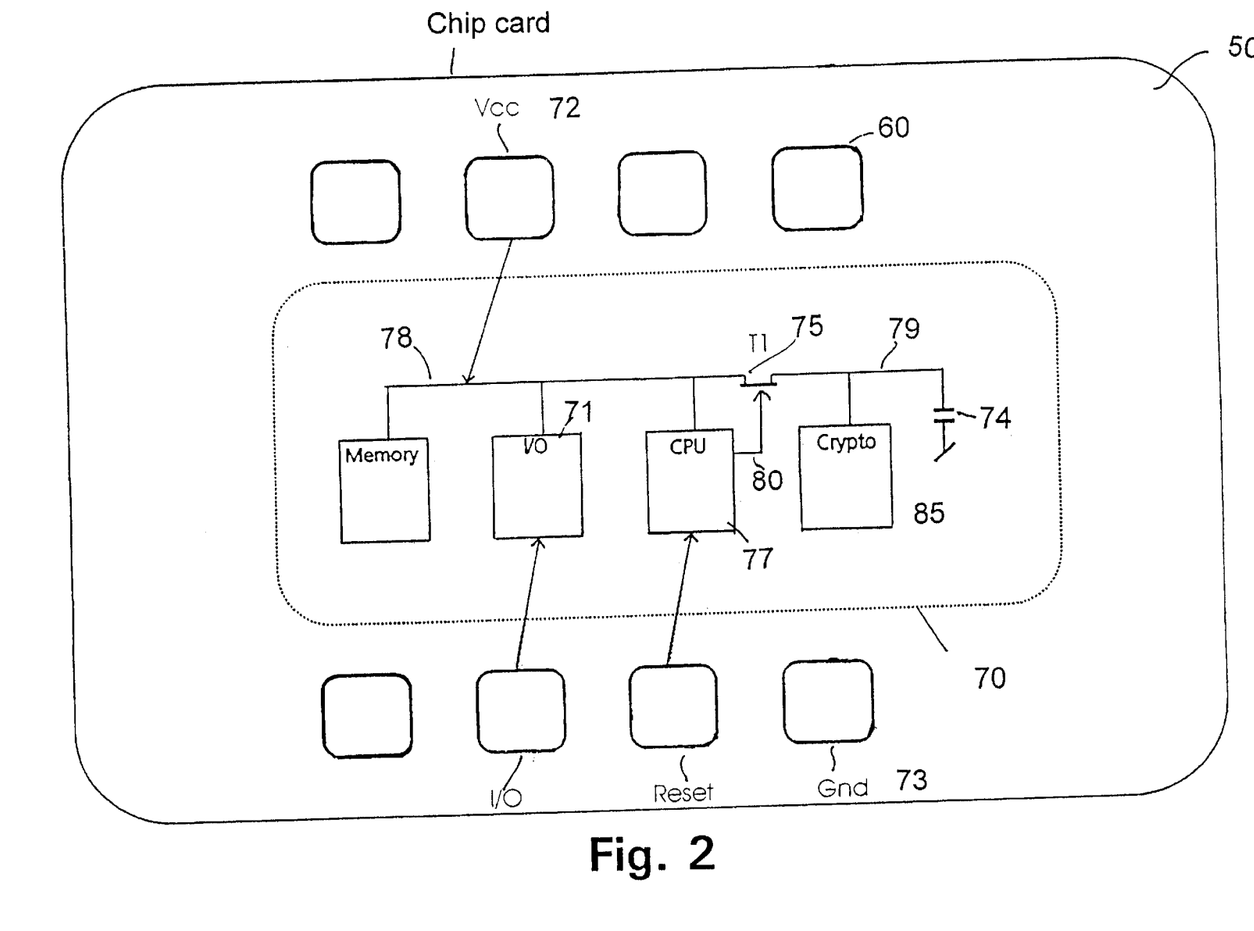
FIG. 2 illustrates a chip-card according to another embodiment of the invention.

FIG. 2 illustrates a chip-card for secure processing of information to be kept secret. The chip-card comprises a plastic carrier 50 holding a number of gold-plated contact pads 60 that provide electrical connections between a chip card processor 70 and a chip-card reader (not shown) typically located within an ATM or cash machine. Data or information may be communicated between the chip-card and the ATM by virtue of a bi-directional serial I/O port 71. Pads Vcc and GND, 72 and 73, respectively, provide electrical power from the ATM to the chip-card processor 70 during "normal" information processing from a first power supply source housed within the ATM. A chip capacitor 74 (C1) provides a second power supplying means in the form of a charge storing device which can be charged from the first power supply source by turning a switch device in the form of a chip integrated MOS-transistor 75 (T1) ON. The switching of T1 is controlled by a control signal originating from a CPU part 77 of the chip card processor. The MOS-transistor 75 is arranged between a primary voltage supply line 78 and a secondary supply line 79 connected to a crypto-processor 85 and to the chip capacitor 74. Thereby the crypto-processor 85 can be disconnected from the primary voltage supply line 78 by turning MOS-transistor 75 OFF and instead be supplied with power from the charge stored on capacitor (74).

The capacitor 74 may alternatively be mounted externally to the chip card processor. A suitable external capacitor could be a tantalum SMD type capacitor or a substrate type capacitor or any other capacitor type with sufficiently small dimensions to integrated with the chip card. If the capacitor is external, an external switching device may also be utilised and having a control terminal connected to an I/O port of the chip card processor so as to appropriately control the states of the switching device. The switching device may be any suitable electronic device or devices such as JFETs, MOSFETs, bipolar transistors, diodes etc. or any suitable combination thereof.

As explained above, the chip card processor may have two distinct operating modes, a first mode for simplicity designated "normal mode" and a second mode, designated "secret mode". The term normal mode here refers to a mode wherein the processor 70 runs instructions that do not process or otherwise manage any secret information that must be kept safe for third parties e.g. fraudulent persons. Accordingly, the secret mode refers to a mode wherein the chip-card processor 70 runs instructions managing partly or solely secret information. These secret data or information could be encryption/decryption of account and transaction information as well as PIN codes related to the account of a chip-card holder. Before entering the secret operation mode, the CPU 77 may first provide the crypto-processor 85 with required data and subsequently switch the MOS-transistor 75 OFF by pulling its gate terminal 80 to an appropriate supply voltage. Accordingly, the first supply voltage is now disconnected from the storage capacitor 74 (apart from a, typically, negligible leakage current through the transistor 75) and the security critical data processing is now performed by the crypto-processor 85 which is supplied with power from the integrated capacitor 74. Consequently, monitoring the power delivered to the chip card by the first power supply will not reveal security critical information as to the secret keys and processing of the crypto-processor 85. Naturally, the CPU 77 and/or the I/O part 71 of the chip card processor may additionally be supplied with power from the integrated capacitor 74 in at least part a part of the processing time if required. This could be arranged by placing the power-switching device 75 between the Vcc pad 72 and the primary voltage supply line 78. This arrangement has however the disadvantage that the charge drawn from the capacitor 74 will increase so that a larger capacitor is required. Thereby, the capacitor 74 may have to be externally located relative to the chip, a probably less secure solution in some applications.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for secure information processing, the apparatus comprising:
   means for providing the information to be processed,
   means for processing the information,
   means for holding or encapsulating the processing means, and
   first power supplying means for supplying power from a position outside the holding means to the processing means,
   wherein the power supplying means comprises within the holding means:
      power storing means being adapted to receive and store power from the first power supplying means,
      second power supplying means for supplying power to at least a part of the processing means from the power storing means, and
      switching means for preventing power from being fed from the first power supplying means to the at least part of the processing means, and the processing means further comprising:
      means for controlling the switching means, and
      means for encryption and decryption,
   wherein the controlling means is adapted to, prior to the processing of the information, control the switching means to at least substantially prevent power from being fed by the first power supplying means to the at least part of the processing means and allow power to be fed by the second power supplying means to the at least part of the processing means, and, subsequent to the processing of the information, to control the switching means to at least substantially allow power to be fed by the first power supplying means to the at least part of the processing means, and wherein substantially solely the encryption/decryption processing means is supplied with power from the second power supplying means.

2. The apparatus according to claim 1, wherein the apparatus is a chip-card.

3. The apparatus according to claim 2, wherein the chip-card comprises a chip-card processor which comprises an encryption processor.

4. The apparatus according to claim 3, wherein the second power supplying means comprises one or several capacitors integrated on the chip-card processor.

5. The apparatus according to claim 3, wherein the second power supplying means comprises one or several capacitors integrated on a dedicated capacitor substrate abutting the chip-card processor.

6. The apparatus according to claim 1, wherein the switching means are adapted to prevent power from being fed from the first power supplying means to the power storing means while they prevent power feeding from the first power supplying means to the at least part of the processing means.

7. The apparatus according to claim 6, wherein the switching means are also adapted to re-establish power feeding from the first power supplying means to the storing means, when the processing means has performed the processing.

8. The apparatus according to claim 1, the apparatus further comprising means for outputting the processed information.

9. The apparatus according to claim 1, wherein the controlling means are adapted to prevent power feeding from the first power supplying means to the processing means or the at least part of the processing means and optionally the power storing means until the processing means performs the processing.

10. The apparatus according to claim 1, wherein the processor means is adapted to be controlled by a set of instructions, the instructions comprising a preventing instruction making the controlling means instruct the switching means to prevent power feeding from the first power supplying means to the at least part of the processing means and optionally to the power storing means.

11. The apparatus according to claim 10, wherein the set of instructions comprises a subset of instructions making the processing means perform the processing, the subset of instructions being preceded by the preventing instruction.

12. The apparatus according to claim 11, wherein the set of instructions furthermore comprises a re-establishing instruction subsequent to the subset of instructions, the re-establishing instruction making the controlling means re-establish the power feeding from the first power supplying means to the at least part of the processing means and optionally the power storing means.

13. The apparatus according to claim 1, wherein the power storing means are selected from the group consisting of a battery, a capacitor, and an inductor.

14. The apparatus according to claim 1, wherein the switching means are adapted to, when preventing power feeding from the first power supplying means to the at least part of the processing means, break a galvanic connection of the first power supplying means between the outside of the holding means and the processing means.

15. The apparatus according to claim 1, wherein the switching means are also adapted to, when preventing power feeding from the first power supplying means to the power storing means, break a galvanic connection of the first power supplying means between the outside of the holding means and the storing means.

16. The apparatus according to claim 1, wherein the switching means are selected from the group consisting of relays, transistors, and diodes.

17. The apparatus according to claim 1, wherein the storing means and second power supplying means are adapted to automatically provide power to the at least part of the processing means, when the switching means operate to prevent feeding of power from the first power supplying means to the at least part of the processing means.

18. The apparatus according to claim 1, further comprising an additional switching means adapted to selectively prevent and provide power from the storing means and the second power supplying means to the at least part of the processing means, when the switching means operates to prevent feeding of power from the first power supplying means to the at least part of the processing means.

19. The apparatus according to claim 1, wherein the processing means is adapted to perform an encryption, a decryption, an authentication or an authentication check of the information.

20. A method of secure information processing using the apparatus according to claim 1, the method comprising:
providing the information to be processed,
controlling the switching means in order to prevent power feeding from the first power supplying means to the processing means or the at least part of the processing means,
supplying power to the processing means from the power storing means using the second power supplying means, and
processing the information using the processing means or the at least part of the processing means.

21. The method according to claim 20, wherein the switching means prevent power from being fed from the first power supplying means to the power storing means, while also preventing power feeding from the first power supplying means to the at least part of the processing means.

22. The method according to claim 20, wherein the switching means re-establish power feeding from the first power supplying means to the at least part of the processing means, when the processing means has performed the processing.

23. The method according to claim 22, wherein the switching means re-establish power feeding from the first power supplying means to the storing means, when the processing means has performed the processing.

24. The method according to claim 20, further comprising the step of outputting the processed information after the processing thereof.

25. The method according to claim 20, further comprising the step that the controlling means prevent power feeding to the power storing means before the processing means performs the processing.

26. The method according to claim 20, where the processing step is performed when the at least part of the processing means is solely powered by the power storing means.

27. The method according to claim 20, further comprising the step of supplying power from the first power supplying means to the power storing means before the step of controlling the switching means in order to prevent feeding of power from the first power supplying means to the at least part of the processing means.

28. The method according to claim 20, wherein power is automatically provided power to the processing means or the at least part of the processing means, when the switching means is controlled prevent feeding of power from the first power supplying means to the processing means or the at least part of the processing means.

29. The method according to claim 20, wherein the apparatus further comprises an additional switching means, and wherein the method comprises providing, using the additional switching means, power from the storing means and the second power supplying means to the processing means or the at least part of the processing means, when the switching means operate to prevent feeding of power from the first power supplying means to the processing means or the at least part of the processing means.

30. A method of altering an existing apparatus for information processing, the apparatus comprising:

means for providing the information to be processed, means for processing the information, means for holding or encapsulating the processing means, and first means for supplying power from a position outside the holding means to the processing means, the method comprising providing within the holding means:

power storing means being adapted to receive and store power from the first power supplying means, switching means for preventing power from being fed from the first power supplying means to at least a part of the processing means, second means for supplying power from the storing means to said at least part of the processing means, and controlling means for controlling the switching means, said controlling means being comprised in the processing means and being adapted to, prior to the processing of the information, control the switching means to at least substantially prevent power from being fed by the first power supplying means to said at least part of the processing means and allow power to be fed by the second power supplying means to said at least part of the processing means, and, subsequent to the processing of the information, to control the switching means to at least substantially allow power to be fed by the first power supplying means to said at least part of the processing means, so that said at least part of the processing means is solely powered by the power storing means.

31. The method according to claim 30, wherein the processing means is controllable by a set of instructions comprising a subset of adjacent instructions making the processing means perform the processing, the method comprising introducing in the set of instructions a first preventing instruction preceding the subset of instructions, the preventing instruction being adapted to make the controlling means make the switching means prevent power feeding from the first power supplying means to the at least part of the processing means.

32. The method according to claim 31, further comprising inserting a first re-establishing instruction subsequent to the subset of instructions, the re-establishing instruction being adapted to make the controlling means make the switching means re-establish power feeding from the first power supplying means to the at least part of the processing means.

33. The method according to claim 31, the method comprising providing switching means adapted to prevent power from being fed from the first power supplying means to the power storing means and inserting a second preventing instruction preceding the subset of instructions, the second preventing instruction being adapted to make the switching means prevent power feeding from the first power supplying means to the power storing means.

34. The method according to claim 33, comprising providing switching means adapted to re-establish power feeding from the power supplying means to the at least part of the processing means, the method comprising inserting a second re-establishing instruction subsequent to the subset of instructions, the second re-establishing being adapted to make the switching means re-establish power feeding from the first power supplying means to the power storing means.

* * * * *